(12) United States Patent
Ohta (10) Patent No.: US 7,758,096 B2
(45) Date of Patent: Jul. 20, 2010

(54) CHILD SEAT ANCHOR APPARATUS AND PARTITION TRIM

(75) Inventor: Shunsuke Ohta, Shizuoka (JP)

(73) Assignee: Suzuki Motor Corporation, Shizuoka (JP)

( * ) Notice: Subject to any disclaimer, the term of this patent is extended or adjusted under 35 U.S.C. 154(b) by 321 days.

(21) Appl. No.: 11/939,812

(22) Filed: Nov. 14, 2007

(65) Prior Publication Data

US 2008/0111417 A1 May 15, 2008

(30) Foreign Application Priority Data

Nov. 15, 2006 (JP) ............... 2006-309657

(51) Int. Cl.
 *B60N 2/02* (2006.01)
 *A47D 1/10* (2006.01)
(52) U.S. Cl. ................ 296/65.03; 297/250.1
(58) Field of Classification Search ........... 297/250.1, 297/253, 254, 216.11; 280/801.1; 296/35.1, 296/35.2, 37.15, 37.16, 63, 65.03
See application file for complete search history.

(56) References Cited

U.S. PATENT DOCUMENTS 6,666,504 B2 12/2003 Guanzon et al.
6,767,057 B2 * 7/2004 Neelis ................. 297/253
2002/0104190 A1 8/2002 Moore et al.

FOREIGN PATENT DOCUMENTS

| JP | 2002-2440 | 1/2002 |
|---|---|---|
| JP | 2002104037 | 4/2002 |
| JP | 3489274 | 11/2003 |
| KR | 10-2002-0051238 | 6/2002 |

OTHER PUBLICATIONS

English language Abstract of JP 2002-104037.
English language Abstract of JP 9-11847.
Office Action issued in Chinese Patent Application No. 200710187893.5 on Jun. 19, 2009.
German Office Action issued on Oct. 7, 2009, in corresponding German Patent Application No. 102007056110.7.

* cited by examiner

*Primary Examiner*—Milton Nelson, Jr.
(74) *Attorney, Agent, or Firm*—Stein McEwen, LLP (57) ABSTRACT

A partition panel is disposed in the rear of a seat. A tether anchor is attached to the partition panel and adapted to be coupled to a tether of a child seat. A partition trim covers the partition panel from above and is formed with a opening disposed above the tether anchor. A cover is movable along a face of the partition trim to open and close the opening.

4 Claims, 7 Drawing Sheets

CHILD SEAT ANCHOR APPARATUS AND PARTITION TRIM

The disclosure of Japanese Patent Application No. 2006-309657 filed on Nov. 15, 2006 including specification, drawings and claims is incorporated herein by reference in its entirety.

BACKGROUND

The present invention relates to a child seat anchor apparatus and a partition trim.

In a typical vehicle, there is provided a partition panel inside the vehicle to define an interior and a trunk. Specifically, the partition panel is disposed from the lower end of a back window opening to the front side of the vehicle and blocks a portion between the peripheral area of the upper end portion of a seatback of a rear seat and the lower end portion of the back window opening. Further, in the vehicle having a child seat mounted on the rear seat, a tether anchor for locking a tether of the child seat is fixed on the upper surface of the partition panel in the front side of the vehicle by the use of a bolt. Additionally, an opening for opening the upper portion of the tether anchor is formed on the partition trim covering the partition panel from the upside.

At this time, an outer appearance may not look good in the case where the opening is opened. For this reason, in Patent Document 1, there was provided a cover on the partition trim to open or close the opening while moving around a horizontal axis on the rear side.

Additionally, in Patent Document 2, there was provided a technology that is designed to allow the tether anchor to protrude from the upside of the opening and attach a box-like shaped cover moving vertically to be opened or closed to the tether anchor in the periphery of a thin hinge on the rear side, so that an anchor non-use time when the cover covers the tether anchor and an anchor use time when the tether anchor is exposed are switched to each other.

Patent Document 1: Japanese Patent Publication No. 2002-104037A

Patent Document 2: Japanese Patent No. 3489274

However, in the configuration in Patent Document 1, since the cover moves around the horizontal axis to be opened or closed, a problem may arise in that the structure is complicated and attaching work needs much trouble because the number of parts of a rotation mechanism increases. Additionally, a rear view may be interrupted since the cover is upright from the upper surface of the partition trim at the anchor use time when the tether of the child seat is attached to the tether anchor. Further, the cover may be deformed or slipped out from the partition trim when an alien substance is jammed therein.

In the configuration in Patent Document 2, since the box-like shaped cover protrudes from the upper portion of the partition trim, a problem may arise in that the outer appearance does not look good at the anchor non-use time when the tether of the child seat is not attached to the tether anchor because the cover and the partition trim do not appear to be one member.

SUMMARY

It is therefore an object of the invention to provide a child seat anchor apparatus that is designed to reduce the number of parts, improve attaching workability, improve an outer appearance at the use time when a tether of a child seat is attached to a tether anchor or at the non-use time when the tether of the child seat is not attached to the tether anchor, and prevent a situation that a cover is deformed or slipped out from a partition trim when an alien substance is jammed therein without interrupting a rear view even in use, and a partition trim of the child seat anchor apparatus.

In order to achieve the above objects, according to a first aspect of the invention, there is provided a child seat anchor apparatus, comprising: a partition panel disposed in the rear of a seat; a tether anchor attached to the partition panel and adapted to be coupled to a tether of a child seat; a partition trim covering the partition panel from above and formed with a opening disposed above the tether anchor; and a cover movable along a face of the partition trim to open and close the opening.

According to the above-described configuration, since the cover for opening or closing the opening while moving along the surface of the partition trim is provided, it is possible to decrease the number of the parts when compared to the related-art cover opening or closing means with the rotation mechanism. Accordingly, the structure can be configured to be simple and attaching workability can be improved. Further, since the cover does not protrude above the partition trim when the cover is opened, the rear view is not interrupted and there is no possibility that an alien substance is jammed in the cover. Furthermore, since the cover and the partition trim easily appear to be one member at the anchor non-use time when the tether of the child seat is not attached to the tether anchor, the outer appearance can look good at the anchor non-use time.

The partition trim may include a curved protruding portion protruding upward and having an arc shape when viewed from the side; and the opening may be formed in the curved protruding portion.

Since the opening is formed in the curved protruding portion, it is possible to open the front portion and the upper portion of the tether anchor when the cover is opened. Accordingly, since the front portion of the tether anchor is opened, interference between the tether and a peripheral portion of the opening can be prevented. Further, since the upper portion of the tether anchor is opened, the tether can be easily attached to the tether anchor.

For example, in the structure in which the opening is formed in an inclined plane that is formed in the partition trim so as to protrude its rear portion, a problem may arise in that the length of the opening in front and back directions of the vehicle and up and down directions thereof is made long when opening areas of the front portion and the upper portion of the opening at the time of opening the cover are required to have the same size as that of the above-described configuration according to the invention. As a result, the size of the opening increases too much. Conversely, in the configuration according to the invention, it is possible to attain the opening that has a small size and that opens the front portion and the upper portion of the tether anchor in a desired size by forming the opening in the curved protruding portion. Accordingly, the structure can be configured to be simple and the outer appearance can be further improved.

The child seat anchor apparatus may further comprise a guide unit formed on a rear face of the partition trim to guide the cover in a cover moving direction, the guide unit being formed with a first guide groove portion extending in the cover moving direction so that one side of the cover is slidable on the first guide groove, and a second guide groove portion extending in the cover moving direction so that another side of the cover is slidable on the second guide groove.

Since the guide unit for guiding the cover is formed in the rear face of the partition trim, the guide unit can be hidden therein. Accordingly, the outer appearance can be improved and the cover and the partition trim can easily appear to be one member. Further, since the first guide groove portion for sliding and guiding the one side of the cover and the second guide groove portion for sliding and guiding the another side of the cover are provided, the cover can be smoothly and securely opened or closed with a simple structure.

First protrusions having an arc shape when viewed in cross section may be formed on front and rear faces of the cover at the one side of the cover so as to slide on a pair of groove faces of the first guide groove portion; and second protrusions having an arc shape when viewed in cross section may be formed on front and rear faces of the cover at the another side of the cover so as to slide on a pair of groove faces of the second guide groove portion.

Since the first protrusions and the second protrusions slide on the groove faces, a friction resistance between the groove faces and the first and second protrusions decreases. Accordingly, the cover can be smoothly opened or closed and both surfaces of the cover can be prevented from being jammed in the groove surfaces. Further, a damage occurring on the both faces of the cover can be prevented and the outer appearance of the cover can be improved.

The rear face of the partition trim may include one of the groove faces of the first guide groove portion and one of the groove faces of the second guide groove portion.

With the above configuration, the cover can be approached to the opening of the partition trim in the thickness direction of the partition trim. Accordingly, the cover and the partition trim can easily appear one member and the outer appearance can be further improved.

The child seat anchor apparatus may further comprise: a first guide wall having a rib shape, extending in the cover moving direction and protruding from the rear face of the partition trim; and a second guide wall having a rib shape, extending in the cover moving direction and protruding from the rear face of the partition trim. The first guide groove portion may be formed in a base end of the first guide wall and the second guide groove portion is formed in a base end of the second guide wall. The first guide wall and the second guide wall may be elastically deformable in a direction away from each other. Side faces of the first and second guide walls, which face each other may be formed into taper faces so as to increase widths of the first and second guide walls toward the opening.

As described above, in a process of attaching the cover to the partition trim, the one and the another sides of the cover is first brought into contact with the pair of side faces of the first guide wall and the second guide wall from the rear side of the partition trim; when the cover is pushed to the opening, the one and the another sides of the cover is guided along the pair of side faces so that the first guide wall and the second guide wall are elastically deformed and widened; and the one and the another sides of the cover is fitted into the first guide groove portion and the second guide groove portion, respectively, and the first guide wall and the second guide wall is elastically restored so that the cover is attached to the partition trim. That is, the cover can be easily attached to the partition trim just by pushing the cover to the opening from the rear side of the partition trim. Accordingly, attaching workability is further improved.

The child seat anchor apparatus may further comprise: a handle for opening and closing the cover, formed on and protruded from a front face of the cover and positioned at one end of the cover in the cover moving direction; a first cover receiving portion formed on the taper face of the first guide wall, positioned at one end of the first guide wall and having a first cover receiving face perpendicular to a protruding direction of the first guide wall; and a second cover receiving portion formed on the taper face of the second guide wall, positioned at one end of the second guide wall and having a second cover receiving face perpendicular to a protruding direction of the second guide wall. The handle and the first and second cover receiving portions may be positioned so as to prevent the cover from being attached to the partition trim upside down.

In the process of attaching the cover to the partition trim, when the cover is pushed to the opening upside down in the cover moving direction, the following (A) or (B) may be performed.

That is, (A) the first and second cover receiving faces of the first and second cover receiving portions receive the one and the another sides of the cover. Since the first and second cover receiving faces are perpendicular to the protruding direction of the first and second guide walls, a pressing force of the cover is transmitted to the first guide wall and the second guide wall in the direction opposite to the protruding direction. Accordingly, the first guide wall and the second guide wall are not deformed and widened in a direction away from each other since a component of the pressing force transmitted to the first guide wall and the second guide wall in the width direction is not generated. Therefore, the cover cannot enter and fitted into the first and second guide groove portions.

Alternatively, (B) since the handle comes into contact with the rear face of the partition trim, the cover cannot be attached to the partition trim. In terms of (A) and (B) described above, it is possible to prevent the cover from being attached to the partition trim upside down in the cover moving direction in the attachment process.

According to a second aspect of the invention, there is provided the partition trim of the child seat anchor apparatus described above, wherein a first convex portion is formed on and protruded from the rear face of the partition trim to form a first engagement groove between the first convex portion and one end of the first guide wall; a second convex portion is formed on and protruded from the rear face of the partition trim to form a second engagement groove between the second convex portion and one end of the second guide wall; and the partition trim is adapted to attach a closing cover instead of the cover, the closing cover having a first projection adapted to engage with the first engagement groove, a second projection adapted to engage with the second engagement groove such that the closing cover is fixed to the partition trim while closing the opening.

When the partition trim with the above-described configuration constitutes the child seat anchor apparatus, the same advantage as described above can be obtained. With such a configuration, it is possible to attach the partition trim with the above-described configuration to a vehicle not having the child seat anchor apparatus.

That is, one and the another sides of the closing cover for normally closing the opening instead of the cover which can be opened or closed, are brought into contact with the pair of guide faces of the first guide wall and the second guide wall from the rear side; when the closing cover is pushed toward the opening, the one and the another sides of the closing cover is guided along the pair of guide faces so that the first guide wall and the second guide wall are elastically deformed and widened; the one and the another sides of the closing cover are fitted into the first and second guide groove portions and the first and second guide walls are elastically restored. In addition, the first projection which projects out in a width direction of the closing cover is engages with the first engagement groove; a second projection which projects out in the width direction of the closing cover engages with the second engagement groove, so that the closing cover is attached.

The movement of the closing cover in the longitudinal direction (which is the cover moving direction) of the first guide wall and the second guide wall is prevented by engagements of the first and second projections of the closing cover and the first and second engagement grooves. Additionally, the movement of the closing cover in the direction perpendicular to the longitudinal direction is prevented since the one and the another sides of the closing cover are fitted into the first and second guide groove portions, respectively. As described above, it is possible to attach the closing cover to the partition trim just by pushing the closing cover toward the opening from the rear side of the partition trim. Accordingly, attaching workability of the closing cover can be improved.

According to the first aspect of the invention, it is possible to provide a child seat anchor apparatus that is designed to reduce the number of parts, improve attaching workability, improve an outer appearance at the use time when a tether of a child seat is attached to a tether anchor or at the non-use time when the tether of the child seat is not attached to the tether anchor, and prevent a situation that a cover is deformed or slipped out from a partition trim when an alien substance is jammed therein without interrupting a rear view even in use.

According to the second aspect of the invention, it is possible to provide the partition trim with the same advantage as described when the partition trim constitutes the child seat anchor apparatus. Further, it is possible to provide the partition trim with a common feature between vehicles having the child seat anchor apparatus and not having the child seat anchor apparatus.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF THE EMBODIMENTS

Figure 1:
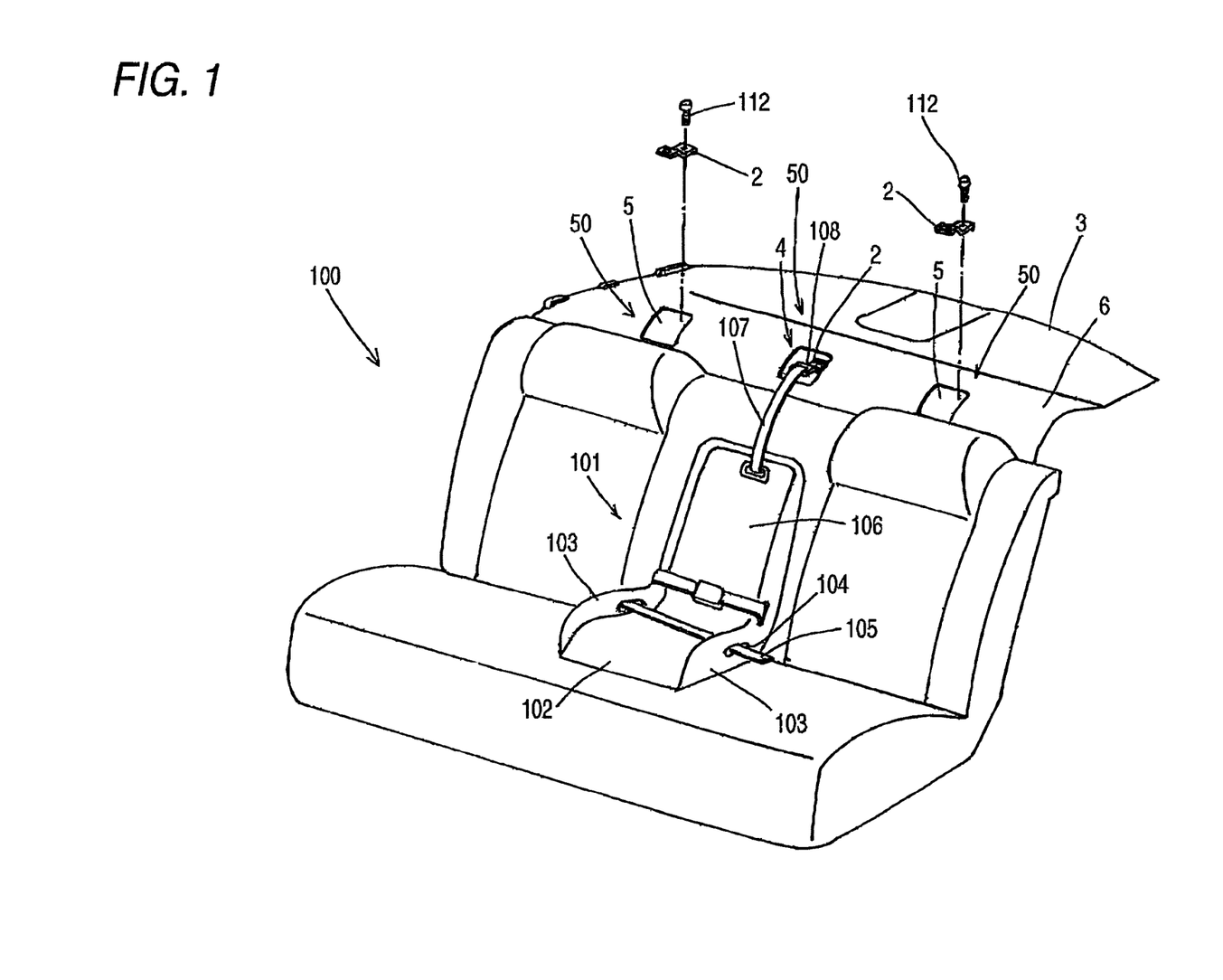
FIG. 1 is a perspective view showing a rear seat of a vehicle and a structure in the periphery thereof according to an embodiment of the present invention.
Figure 2:
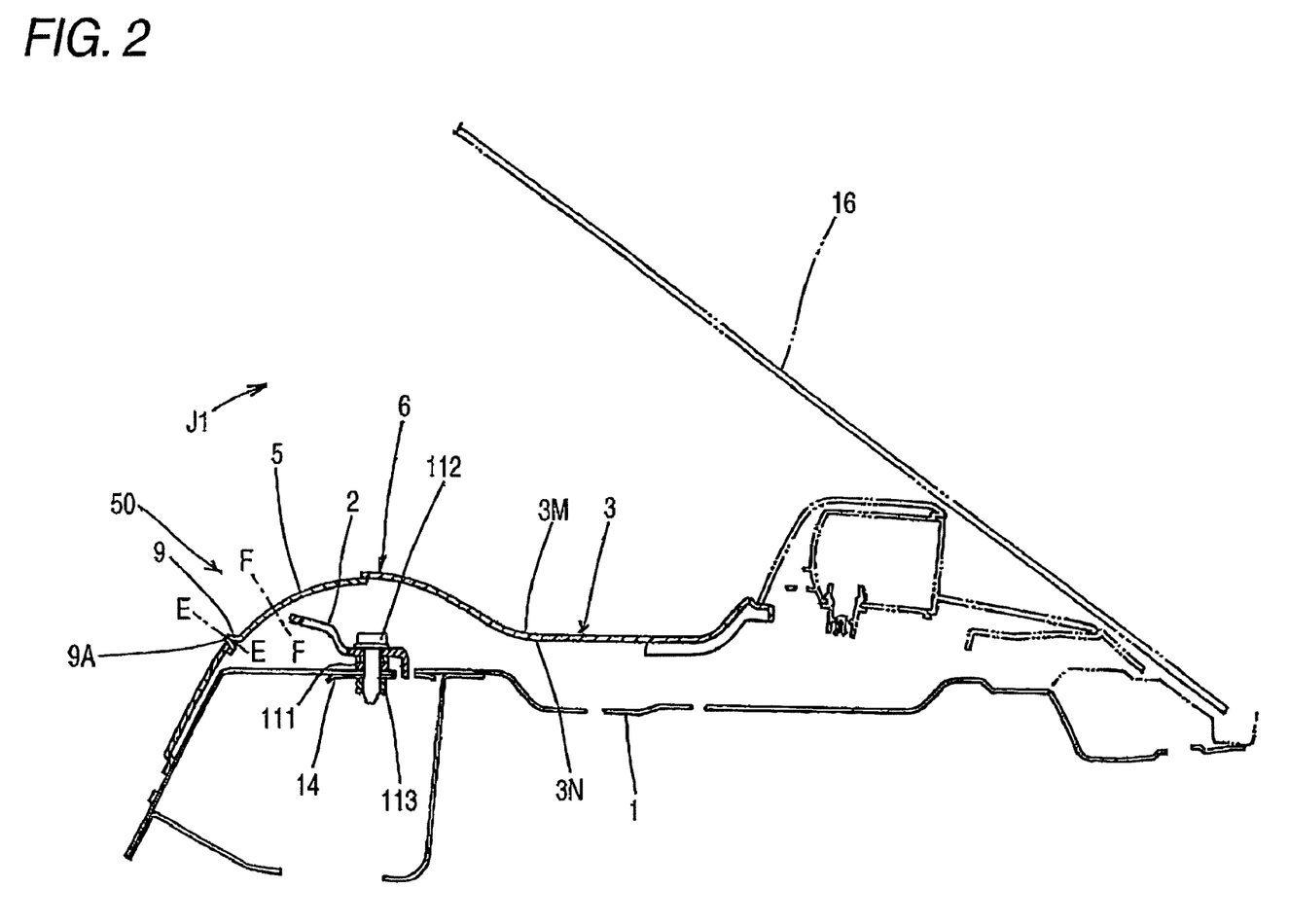
FIG. 2 is a section view showing a child seat anchor apparatus according to the embodiment.
Figure 3:
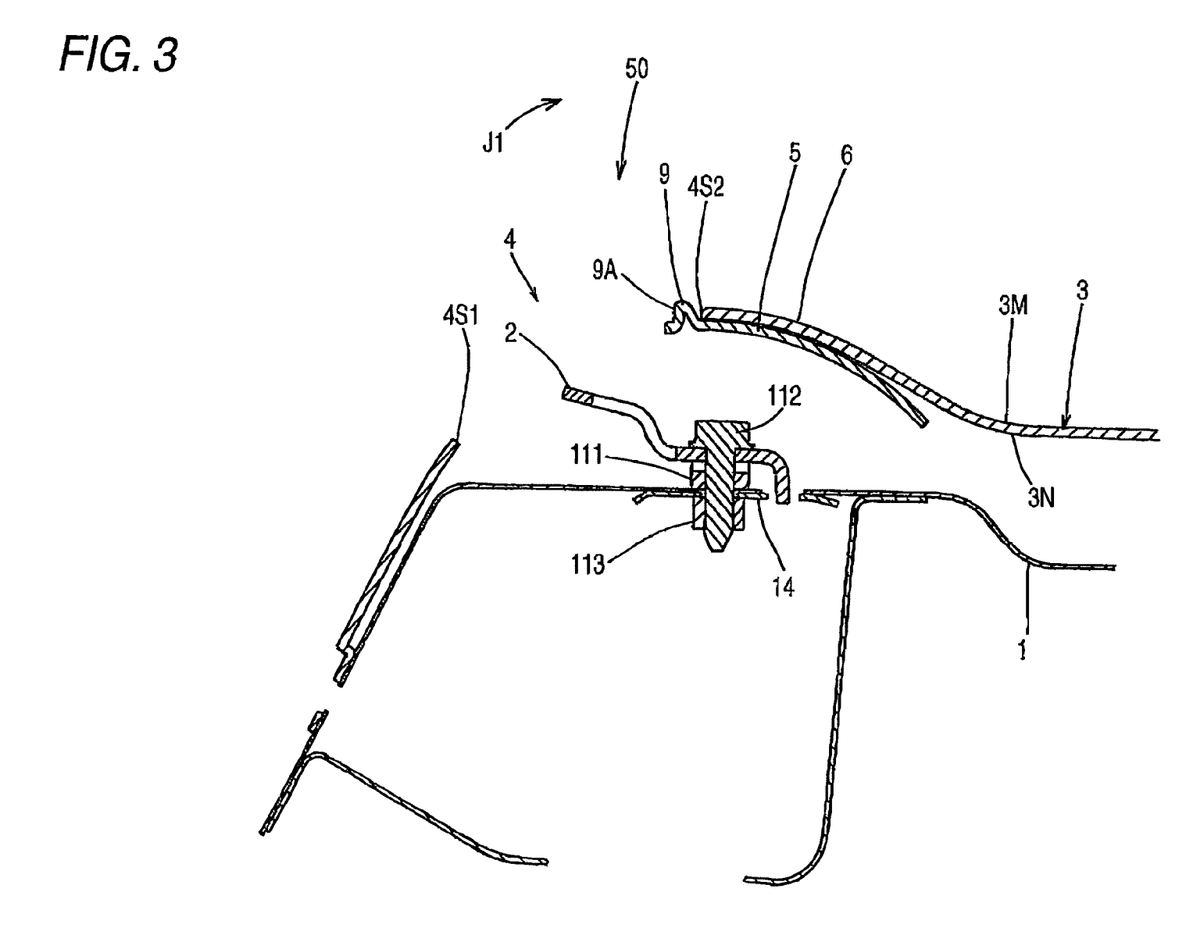
FIG. 3 is a section view showing the child seat anchor apparatus when the cover is opened.

Hereinafter, exemplary embodiments of the invention will be described with reference to the drawings. As shown in FIG. 1, a child seat 101 is disposed at the center of a rear seat 100 of a vehicle, and a seat belt 105 is inserted through a horizontal belt hole 104 formed on both side portions 103 of a seat 102 of the child seat 101 so as to be fixed thereto. In this way, the child seat 101 is attached to the rear seat 100. As shown in FIGS. 2 and 3, a tether anchor 2 that fixes a tether 108 of the child seat 101 is attached to a partition panel 1 that is disposed in rear of the rear seat 100 to define a vehicle interior and a trunk. The tether 108 of a belt 107 attached to the upper end of a rear portion 106 of the child seat 101 is coupled with and locked to the tether anchor 2. The tether anchor 2 is attached to the partition panel 1 via a spacer 111 by the use of the bolt 112 and a nut 113. The nut 113 is fixed to the rear surface of the partition panel 1 by a welding process. A partition panel portion below the tether anchor 2 is strengthened by a strengthening plate 14.

As shown in FIGS. 2 and 3, a child seat anchor apparatus 50 is configured such that an opening 4 for opening the upside of the tether anchor 2 is formed in a partition trim 3 covering the partition panel 1 from the upside, and a cover 5 for opening or closing the opening 4 while moving along both surfaces 3M and 3N of the partition trim 3 are provided. Three child seat anchor apparatuses 50 are arranged in the vehicle width direction at a uniform distance (see FIG. 1). The partition trim 3 engages with a vehicle body in the periphery of a back window glass 16 by the use of a locking claw that is formed in the rear portion in a form of a single member, and is fixed to the upper surface of the partition panel 1 by the use of a dip. Additionally, the left and right portions of the partition trim 3 engage with the lower end of an interior trim of a rear filler, the rear end thereof is disposed in the periphery of the back window glass 16, and the front side portion thereof curves downward along a seatback of the rear seat 100. At this time, the partition trim 3 is fixed to the vehicle body even in the position in which the partition trim 3 curves downward and is hidden by the seatback. Next, the child seat anchor apparatus 50 will be described in detail.

A curved protruding portion 6 with a convex arc shape in a side view is formed on the side of the rear seat 100 of the partition trim 3, and the opening 4 is formed on the curved protruding portion 6 from the top point thereof toward the front side of the vehicle. The opening 4 has the same left and right widths and has a rectangular shape when viewed from the front side of the vehicle. The cover 5 is made of a resin material and formed in an arc shape along the curved protruding portion 6 when viewed from the side of the vehicle. Additionally, the cover 5 is formed in a rectangular shape when viewed from the front side of the vehicle. That is, the cover 5 is formed in a shape in which a rectangular flat plate is curved in an arc shape. The cover 5 moves along the both surfaces 3M and 3N of the partition trim 3 in the obliquely front and back directions of the vehicle. A mark representing an existence of an anchor is formed on the surface of the cover 5 (see FIGS. 7(a) and 7(b)), and a pair of strengthening ribs 77 are provided on the rear surface.

Figure 4:
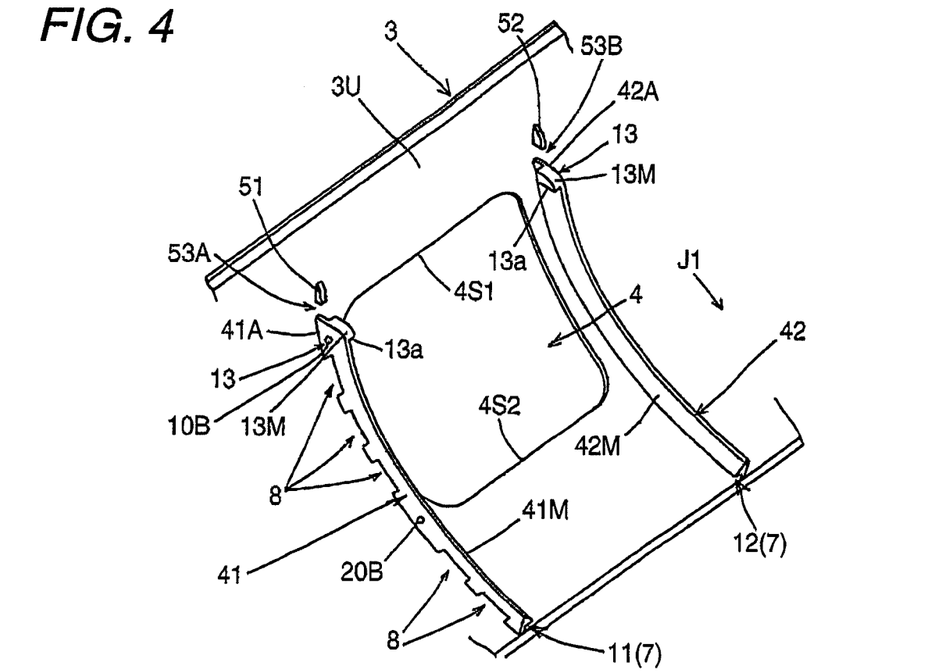
FIG. 4 is a perspective view showing a partition trim according to the embodiment when viewed from the rear side thereof.
Figure 6:
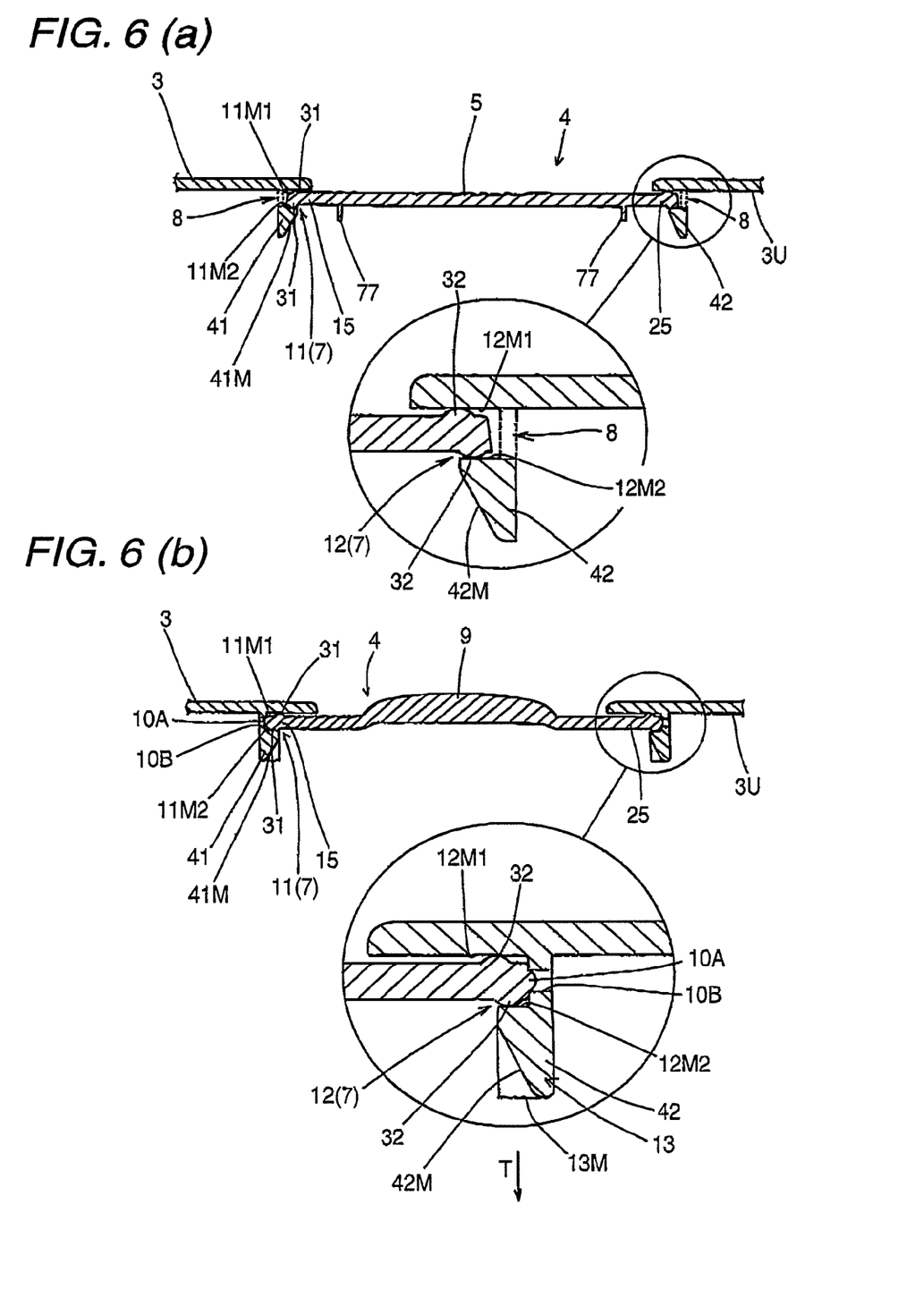
FIG. 6(a) is a section view taken along line F-F in FIG. 2.
FIG. 6(b) is a section view taken along line E-E in FIG. 2.

As shown in FIGS. 4, 6(a), and 6(b), a guide unit 7 for guiding the cover 5 is provided on the rear surface of the partition trim 3. The guide unit 7 includes a first guide groove portion 11 for sliding and guiding one side portion 15 of the cover 5 and a second guide groove portion 12 for sliding and guiding the other side portion 25 of the cover 5. Thus, the cover 5 is of a slide type.

Figure 7A:
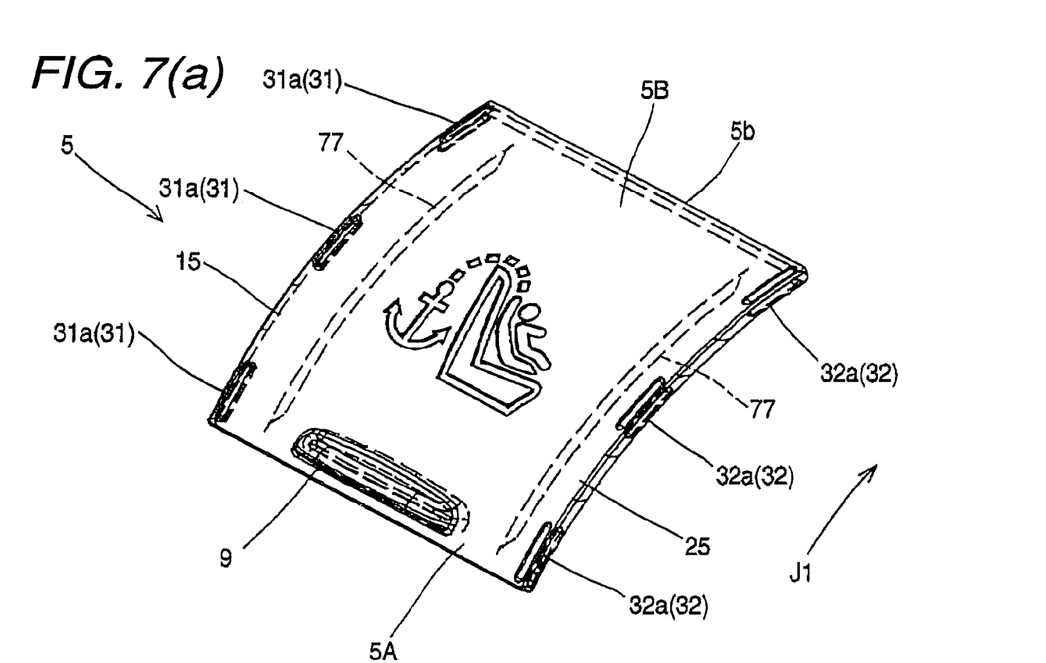
FIG. 7(a) is a perspective view showing a cover according to the embodiment.
Figure 7B:
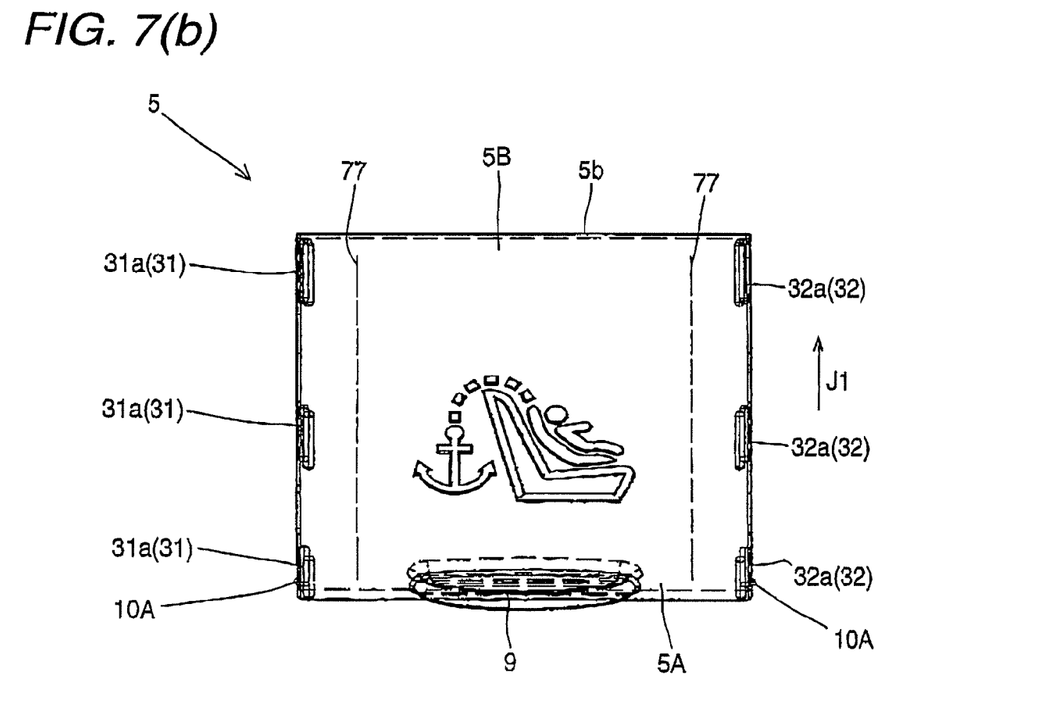
FIG. 7(b) is a front view showing the cover (when viewed from the front side of the vehicle)

Each of first protrusions 31 with an arc shape in a sectional view that slides on a pair of guide groove surfaces 11M1 and 11M2 of the first guide groove portion 11 is formed on both surfaces of the one side portion 15 of the cover 5. Also, each of second protrusions 32 with an arc shape in a sectional view that slides on a pair of guide groove surfaces 12M1 and 12M2 of the second guide groove portion 12 is formed on both surfaces of the other side portion 25 of the cover 5. As shown in FIGS. 7(a) and 7(b), the first protrusion 31 is constituted by a plurality of protrusions 31a that are arranged at a predetermined distance from each other in the direction in which the cover 5 is opened or closed, and also the second protrusions 32 is constituted by a plurality of protrusions 32a that are arranged at a predetermined distance from each other in the direction in which the cover 5 is opened or closed. The groove surface 11M1 on the one side of the first guide groove portion 11 and the groove surface 12M1 on the one side of the second guide groove portion 12 axe configured by the rear surface 3U of the partition trim 3 (see FIGS. 6(a) and 6(b)).

The first guide groove portion 11 is formed in an attachment portion of a first guide wall 41 with a rib shape protruding from the rear surface 3U of the partition trim 3 so as to open toward the second guide groove portion 12 in a U shape in a sectional view. Also, the second guide groove portion 12 is formed in an attachment portion of a second guide wall 42 with a rib 6 shape protruding from the rear surface 3U of the partition trim 3 so as to open toward the first guide groove portion 11 in a U shape in a sectional view. As a plurality of horizontal through holes 8 (see FIGS. 4 and 6(a)) are formed on the attachment portions of the first guide wall 41 and the second guide wall 42 in the longitudinal direction thereof at a distance from each other, the first guide wall 41 and the second guide wall 42 are configured to be elastically deformable in the direction in which they separate from each other. Additionally, a pair of opposed side walls 41M and 42M positioned on the front ends in the protruding direction T of the first guide wall 41 and the second guide wall 42 are formed into taper surfaces (inclined surfaces), respectively so as to increase widths of the first guide wall 41 and the second guide wall 42 toward the opening 4 (see FIGS. 6(a) and 6(b)). Since a plurality of the horizontal through holes 8 are formed on the attachment portions of the first guide wall 41 and the second guide wall 42 in the longitudinal direction thereof at a distance from each other, it is possible to prevent a shrinkage (a partial sinking occurring in a forming process) on the surface of the partition trim 3.

Meanwhile, in an attachment process of attaching the cover 5 to the partition trim 3, one side portion 15 and the other side portion 25 of the cover 5 are brought into contact with the pair of side surfaces 41M and 42M of the first guide wall 41 and the second guide wall 42 from the rear side of the partition trim 3. Subsequently, at the time of pushing the cover 5 to the opening 4, the one side portion 15 and the other side portion 25 of the cover 5 are guided along the pair of guide surfaces 41M and 42M using the taper surfaces formed on the side walls 41M and 42M so that the first guide wall 41 and the second guide wall 42 are widened against an elastic force. Subsequently, the one side portion 15 and the other side portion 25 are fitted into the first guide groove portion 11 and the second guide groove portion 12, respectively, and the first guide wall 41 and the second guide wall 42 are elastically restored. Consequently, the cover 5 is attached to the partition trim 3.

As shown in FIGS. 2, 3, 7(a), and 7(b), an opening or closing handle 9 is formed on and protruded from the front surface of the upper end portion 5A of the cover 5 in the opening direction J1 of the cover 5. The opening or closing handle 9 is positioned at the center of the width direction of the cover 5. At this time, a closing side surface 9A (which is a surface facing an upper portion in the opening direction) of the opening or closing handle 9 erects at a right angle relative to the both surfaces of the cover 5 and protrudes to the upside thereof while passing through the opening 4. When the opening 4 is dosed by the cover 5, the opening or closing handle 9 comes into contact with a peripheral portion 4S1 on the closing side of the opening 4, so that the closing side is controlled Conversely, when the opening 4 is opened, the opening or dosing handle 9 comes into contact with a peripheral portion 4S2 on the opening side of the opening 4, so that the opening side is controlled.

Each of first engagement convex portions 10A with a semicircular shape is formed on both side surfaces of the upper end 5A of the cover 5 in the opening direction J1 of the cover 5 so as to protrude in the width direction of the cover 5 (see FIG. 7(b)). Additionally, each of first engagement holes 10B engaging with the first engagement convex portion 10A is formed on the upper end portion 41A of the first guide wall 41 and the upper end portion 42A of the second guide wall 42 in the opening direction. That is, when the cover 5 is closed (when completely closed), the first engagement convex portions 10A on the left and fight sides of the cover 5 engage with the first engagement holes 10B, so that a position of the cover 5 is fixed thereto (see FIG. 6(b)). The upper end portion 41A of the first guide wall 41 and the upper end portion 42A of the second guide wall 42 in the opening direction are positioned in the periphery of the peripheral portion 4S1 on the closing side of the opening 4 in the opening or closing direction of the cover 5. The lower end of the first guide wall 41 and the lower end of the second guide wall 42 in the opening direction are positioned more in the lower side of the opening direction than the peripheral portion 4S2 on the opening side of the opening 4. In other words, the length of the first guide wall 41 and the second guide wall 42 in the opening or closing direction of the cover 5 is almost 1.5 times that of the opening 4 in the opening or closing direction (the invention is not limited to this value).

Each of second engagement holes 20B engaging with each of the first engagement convex portions 10A is formed in the middle of the first guide wall 41 and the second guide wall 42 in the longitudinal direction. When the cover 5 is completely opened, each of the first engagement convex portions 10A on the left and right sides of cover 5 engages with each of the second engagement holes 20B, so that the position of the cover 5 is fixed thereto. For example, when the tether engages with the tether anchor and an opening degree of the opening 5 is necessary to be minimized, it is possible to fix the position of the opening 4 by disposing the second engagement holes 20B on desired positions in the first guide wall 41 and the second guide wall 42, and then engaging the first engagement convex portions 10A with the second engagement holes 20B.

[Means for Preventing Erroneous Attachment]

As shown in FIGS. 4, 6(a), and 6(b), each of cover receiving portions 13 for receiving the cover 5 pushed to the opening 4 upside down in the opening or dosing direction thereof is formed on the upper end portion 41A of the first guide wall 41 and the upper end portion 42A of the second guide wall 42 in the opening direction J1. A cover receiving surfaces 13M that are perpendicular or substantially perpendicular to the protruding direction T in which the first guide wall 41 and the second guide wall 42 protrude are formed on the cover receiving portions 13, respectively. Each of the cover receiving surfaces 13M are positioned at another cover receiving portion side of the each of cover receiving portions 13. Accordingly, when the cover 5 is pushed to the opening 4 with a posture of a direction opposite to the opening or closing direction in the attachment process, the cover receiving surface 13M receives the one side portion 15 and the other side portion 25 of the cover 5, or the opening or closing handle 9 comes into contact with the rear surface 3U of the partition trim 3 to prevent an erroneous attachment. The cover receiving portion 13 may be formed such that a protruding portion is formed on the taper surfaces inclined plane) that are formed on the pair of opposed side surfaces 41M and 42M of the first guide wall 41 and the second guide wall 42 in the manner that the widths of the first guide wall 41 and the second guide wall 42 becomes larger toward the opening 4.

For example, when an attachment operation is conducted in a state that the cover 5 deviates to the lower side in the opening direction J1 with respect to the opening 4 so that the lower end portion 5B (that is, one side portion and the other side portion of the lower end portion 5; of the cover 5 in the opening direction) of the cover 5 in the opening direction J1 is not received to the cover receiving portion 13, the opening or closing handle 9 comes into contact with the rear surface 3U of the partition trim 3. And thus, the attachment operation cannot be completed. Additionally, when an attachment operation is conducted in a state that the position of the cover 5 deviates to the upper side in the opening direction J1 compared to the above-described attachment operation, the end portion 5B (lower end portion 5B of the cover 5 in the opening direction J1) of the cover 5 is received to (comes in contact with) the cover receiving surface 13M of the cover receiving portion 13. And thus, the attachment operation cannot be completed. In order to exhibit the effect, a length (which is a length when viewed from the side) between the peripheral portion 4S2 on the opening side of the opening 4 and the edge 13a on the cover opening side of the cover receiving portion 13 is configured to be shorter than a length (which is a length when viewed from the side) between the rear surface of the opening or closing handle 9 and the edge 5b on the side of the lower end portion 5B of the cover 5 in the opening direction J1.

[Attachment Structure of Closing Cover 60]

Figure 8:
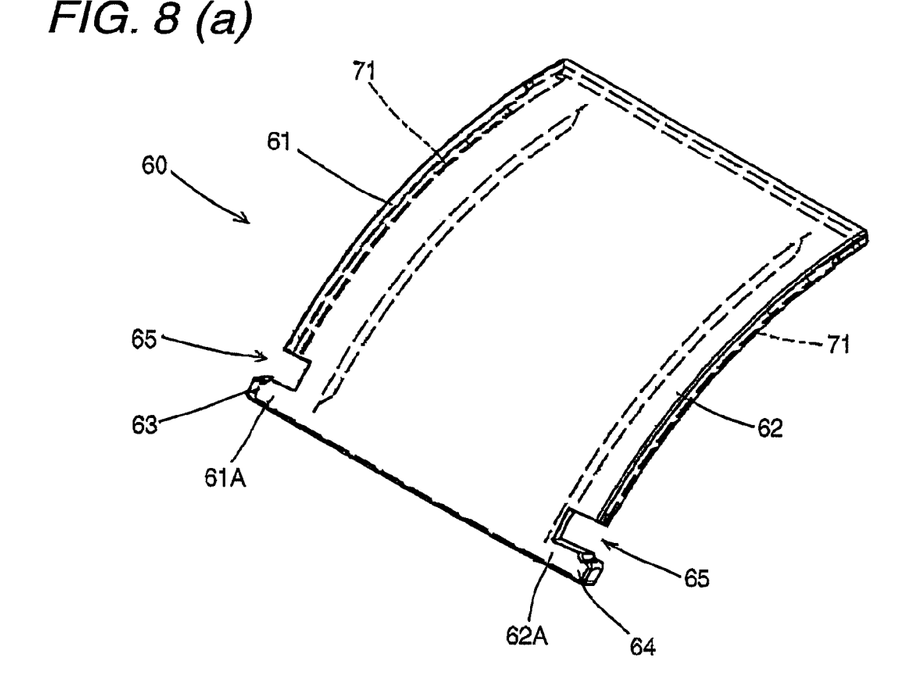
FIG. 8(a) is a perspective view showing a closing cover according to the embodiment.
FIG. 8(b) is a font view showing the closing cover (when viewed from the front side of the vehicle).

As shown in FIG. 4, a first convex portion 51 for forming a first engagement groove 53A between the first convex portion 51 and the upper end portion 41A of the first guide wall 41 in the opening direction J1 of the cover 5 is formed on and protruded from the rear surface 3U of the partition trim 3 at the upper side of the upper end portion 41A of the first guide wall 41 in the opening direction J1. Also, a second convex portion 52 for forming a second engagement groove 53B between the second convex portion 52 and the upper end portion 42A of the second guide wall 42 in the opening direction J1 of the cover 5 is formed on and protruded from the rear surface 3U of the partition trim 3 at the upper side of the upper end portion 42A of the second guide wall 42 in the opening direction J1. The first engagement groove 53A and the second engagement groove 53B are provided in order to position a closing cover 60 (see FIGS. 8(a) and 8(b)), which normally covers the opening 4 instead of the cover 5, in the partition trim 3.

The closing cover 60 is made of a resin material and has the substantially same size as the cover 5. The different points from the cover 5 are as below. Protrusions 71 are formed on only the rear surfaces of one side portion 61 and the other side portion 62 of the closing cover 60 so as to follow along the opening direction J1. A first projection 63 that protrudes out in the width direction from one upper portion 61A of the closing cover 60 in the opening direction J1 and a second projection 64 that protrudes out in the width direction from the other upper portion 62A of the closing cover 60 in the opening direction J1 are provided. Each of cutouts 65 for preventing an interference with the cover receiving portion 13 is formed in the peripheries of the first projection 63 and the second projection 64. Each of third engagement convex portions 70 with a hemispherical shape protrudes from side surfaces of the ends 60B (the lower end portion 60B in the opening direction J1) of the one side portion 61 and the other side portion 62 of the closing cover 60 so as to engage with the second engagement holes 20B.

[Attachment Method of Closing Cover 60]

Figure 5:
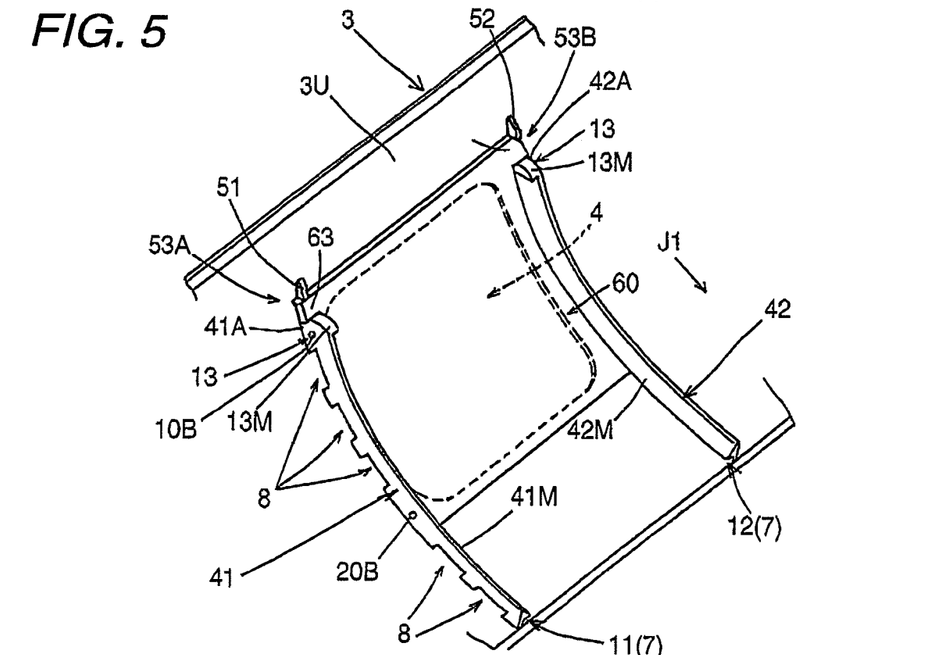
FIG. 5 is a perspective view showing the partition trim in a state where a closing cover is attached to the partition trim.

The closing cover 60 with the above-described configuration is configured to be attached to the partition trim 3 in the same manner as the cover 5. That is, the one side portion 61 and the other side portion 62 of the closing cover 60 are brought into the pair of side surfaces 41M and 42M of the first guide wall 41 and the second guide wall 42 from the rear side of the partition trim, respectively, and the closing cover 60 is pushed to the opening 4. At the time of pushing the closing cover 60, the one side portion 61 and the other side portion 62 of the closing cover 60 are guided along the pair of side surfaces 41M and 42M so that the first guide wall 41 and the second guide wall 42 are widened against an elastic force. Subsequently, the one side portion 61 and the other side portion 62 of the closing cover 60 are fitted into the first guide groove portion 11 and the second guide groove portion 12, respectively, and also the first guide wall 41 and the second guide wall 42 are elastically restored. Additionally, the first projection 63 is disposed between the first convex portion 51 and the end portion 41A of the first guide wall 41 so as to engage with the first engagement groove 53A, the second projection 64 is disposed between the second convex portion 52 and the end portion 42A of the second guide wall 42 so as to engage with the second engagement groove 53B, and the third engagement convex portion 70 engages with the second engagement hole 20B. Further, since the cutouts 65 are formed on the closing cover 60, it is possible to prevent the cover receiving portion 13 from interfering with the closing cover 60. In this way, as shown in FIG. 5, the closing cover 60 is attached to the partition trim 3. In order to easily engage the first projection 63 and the second projection 64 with the first engagement groove 53A and the second engagement groove 53B, respectively, at the time of pushing the closing cover 60, as shown in FIGS. 4 and 5, the cover receiving surface 13M of the cover receiving portion 13 is formed in an arc shape when viewed from the side. That is, front end portions of the end portion 41A of the first guide wall 41 and the end portion 42A of the second guide wall 42 in the protruding direction T that faces the first convex portion 51 and the second convex portion 52 are formed in an arc shape so as to easily insert the first projection 63 and the second projection 64 therein.

Another Embodiment

The apparatus may be configured such that the cover 5 slides in left and right directions of the vehicle.

What is claimed is:

1. A child seat anchor apparatus, comprising:
 a partition panel disposed in the rear of a seat;
 a tether anchor attached to the partition panel and adapted to be coupled to a tether of a child seat;

a partition trim covering the partition panel from above and formed with a opening disposed above the tether anchor;

a cover movable along a rear face of the partition trim to open and close the opening; and a guide unit formed on the rear face of the partition trim to guide the cover in a cover moving direction, the guide unit being formed with:

a first guide groove portion extending in the cover moving direction so that one side of the cover is slidable on the first guide groove portion; and a second guide groove portion extending in the cover moving direction so that another side of the cover is slidable on the second groove portion, wherein:

the partition trim includes a curved protruding portion protruding upward and having an arc shape when viewed from the side;

the opening is formed in the curved protruding portion so that the cover is movable along the curved protruding portion; and the rear face of the partition trim includes one pair of groove faces of the first guide groove portion and one of a pair of groove faces of the second guide groove portion.

2. The child seat anchor apparatus as set forth in claim 1, further comprising:

a first guide wall having a rib shape, extending in the cover moving direction and protruding from the rear face of the partition trim; and a second guide wall having a rib shape, extending in the cover moving direction and protruding from the rear face of the partition trim, wherein:

the first guide groove portion is formed in a base end of the first guide wall and the second guide groove portion is formed in a base end of the second guide wall;

the first guide wall and the second guide wall are elastically deformable in a direction away from each other; and side faces of the first and second guide walls, which face each other are formed into taper faces so as to increase widths of the first and second guide walls toward the opening.

3. The child seat anchor apparatus as set forth in claim 2, further comprising:

a handle for opening and closing the cover, formed on and protruded from a front face of the cover and positioned at one end of the cover in the cover moving direction;

a first cover receiving portion formed on the taper face of the first guide wall, positioned at one end of the first guide wall and having a first cover receiving face perpendicular to a protruding direction of the first guide wall; and a second cover receiving portion formed on the taper face of the second guide wall, positioned at one end of the second guide wall and having a second cover receiving face perpendicular to a protruding direction of the second guide wall, wherein the handle and the first and second cover receiving portions are positioned so as to prevent the cover from being attached to the partition trim upside down.

4. The child seat anchor apparatus as set forth in claim 1, wherein:

first protrusions having an arc shape when viewed in cross section are formed on front and rear faces of the cover at the one side of the cover so as to slide on the pair of groove faces of the first guide groove portion; and second protrusions having an arc shape when viewed in cross section are formed on front and rear faces of the cover at the another side of the cover so as to slide on the pair of groove faces of the second guide groove portion.

* * * * *